(12) United States Patent
Cao et al.

(10) Patent No.: US 8,250,008 B1
(45) Date of Patent: Aug. 21, 2012

(54) DECISION TREE REFINEMENT

(75) Inventors: Zhen Cao, Mountain View, CA (US);
Naval Verma, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 425 days.

(21) Appl. No.: 12/564,452

(22) Filed: Sep. 22, 2009

(51) Int. Cl.
*G01F 15/00* (2006.01)
*G01F 1/00* (2006.01)

(52) U.S. Cl. ............... 706/14; 370/392; 702/76; 726/11

(58) Field of Classification Search ........................ None
See application file for complete search history.

(56) References Cited

U.S. PATENT DOCUMENTS

| | | | |
|---|---|---|---|
| 5,870,735 A | 2/1999 | Agrawal et al. | |
| 6,247,016 B1 | 6/2001 | Rastogi et al. | |
| 2004/0095936 A1 * | 5/2004 | O'Neill et al. | 370/392 |
| 2007/0168377 A1 * | 7/2007 | Zabarsky | 707/102 |

* cited by examiner

*Primary Examiner* — Kakali Chaki
*Assistant Examiner* — Kalpana Bharadwaj
(74) *Attorney, Agent, or Firm* — Fish & Richardson P.C.

(57) ABSTRACT

A model refinement system refines initial split rules that define an initial decision tree to generate final split-rules. The model refinement refines the initial split rules by removing clauses that are satisfied by match scores that are less than a threshold match score to generate initial trimmed rules. Using the initial trimmed rules, the model refinement system classifies an initial training set and filters the initial training set to remove negative training pairs that are classified as duplicate pairs resulting in a filtered training set. An intermediate decision tree defined by intermediate split-rules is generated based on the filtered training set. Final split-rules are generated based on the intermediate split rules and input pairs of data records are classified as duplicate pairs based on attribute values of the input pairs and the final split-rules.

21 Claims, 3 Drawing Sheets

DECISION TREE REFINEMENT

BACKGROUND

This specification relates to data processing techniques such as data mining. Data mining is used, for example, to identify attributes of a dataset that are indicative of a particular result and to predict future results based on the identified attributes. As the number of records in a dataset increase, combinations of attributes and attribute values may be used to predict future results. Therefore, the combinations of attributes and attribute values that are indicative of future results can become more complex, such that machine learning techniques may be used to identify combinations of attributes and attribute values that facilitate computation of predicted results.

A decision tree is an example of a tool that is used to help identify attributes and attribute values that can be used to facilitate computation of predicted results. Decision trees group a dataset into subsets of records based on the attributes and corresponding attribute values of the dataset. The full dataset and each of the subsets of records are represented by nodes. The nodes representing the dataset and each of the subsets of records can be connected by links that are referred to as branches. The nodes are connected in a hierarchical manner such that a predicted result for input data is computed based on sets of rules (i.e., split-points) that define the sets of records that are represented by the nodes. In turn, a node that represents records that have attribute values similar to the input data can be identified from the decision tree and the result corresponding to the identified node can be defined as the predicted result for the input data.

Decision tree models are used for data mining and decision support systems to inform decisions based on expected results. The decision tree models are trained by mapping attribute values of a dataset to results corresponding to the dataset. This mapping can be used to identify expected values for an input set of attribute values. For example, businesses can use decision trees to compute an expected result (e.g., profit, sales, or customer satisfaction) for each option based on an input of attribute values corresponding to each option. In turn, the business can evaluate each available option in a set of options based on the expected result for each option and select the option that is expected to best achieve desired results. However, in some situations, businesses may require expected results having a higher probability of being correct than those being provided by the decision tree model as initially trained.

SUMMARY

In general, one aspect of the described subject matter can be implemented in methods that include having at least one data processing device generate an initial decision tree based on an initial training set. The initial decision tree defines split-rules that each include at least one clause that specifies a match score that satisfies the clause. The initial training set includes training pairs of data records that include positive training pairs that have been identified as duplicate data records and negative training pairs that have not been identified as duplicate data records. Each training pair has match scores specifying a measure of similarity for attributes of the training pair. Initial trimmed rules are generated by removing from the split-rules clauses that are not satisfied by match scores that satisfy threshold match scores. The threshold match scores are based on attribute split-points that specify match scores at which the initial training set is segmented. The negative training pairs in the initial training set are classified based on the match scores for the negative training pairs and the first trimmed rules. Based on the classification, the initial training set is filtered to remove negative training pairs that are classified as duplicate pairs to generate a filtered training set. Final split-rules then are generated based on the filtered training data, and input pairs of data records are classified as duplicate pairs based on attribute values of the input pairs and the final split-rules. Other implementations of this aspect include corresponding systems, apparatus, and computer programs configured to perform the actions of the methods and encoded on computer storage devices.

Implementations may include one or more of the following features. For example, classifying a pair of data records as duplicate pairs can include classifying two user accounts as duplicate user accounts based on the attribute values of the two user accounts and the final split-rules. Duplicate user accounts may be suspended based on the classification. Classifying the initial training set can include computing rule weights for the initial trimmed rules based on training pairs that satisfy the initial trimmed rules; computing classification scores for the training pairs in the initial training set, the classification scores for the training pairs being based the rule weights of the initial trimmed rules that the training records satisfy; and classifying the training pairs based on the classification scores. Computing rule weights can include computing, for each initial trimmed rule, a ratio of a number of positive training pairs that satisfy the initial trimmed rule and a number of negative training pairs that satisfy the initial trimmed rule. Generating final split-rules can include generating an intermediate decision tree with the filtered training set, the intermediate decision tree defining intermediate split-rules; determining quality scores for the intermediate split-rules based on precision measures and coverage measures of the intermediate split-rules; selecting intermediate split-rules for adjustment based on the quality scores; and adjusting the selected intermediate split-rules to generate final split-rules.

Particular implementations can realize one or more of the following advantages. For example, decision rules that are defined by a decision tree can be refined to provide higher precision by removing clauses from the rules that are counter to a similarity relationship of the data and adding additional clauses for selected attributes. Duplicate online accounts can be identified with a threshold likelihood based on the attributes of the online accounts and the refined decision rules.

The details of one or more implementations are set forth in the accompanying drawings and the description below. Other features and advantages will be apparent from the description, the drawings, and the claims.

DETAILED DESCRIPTION

Figure 1:
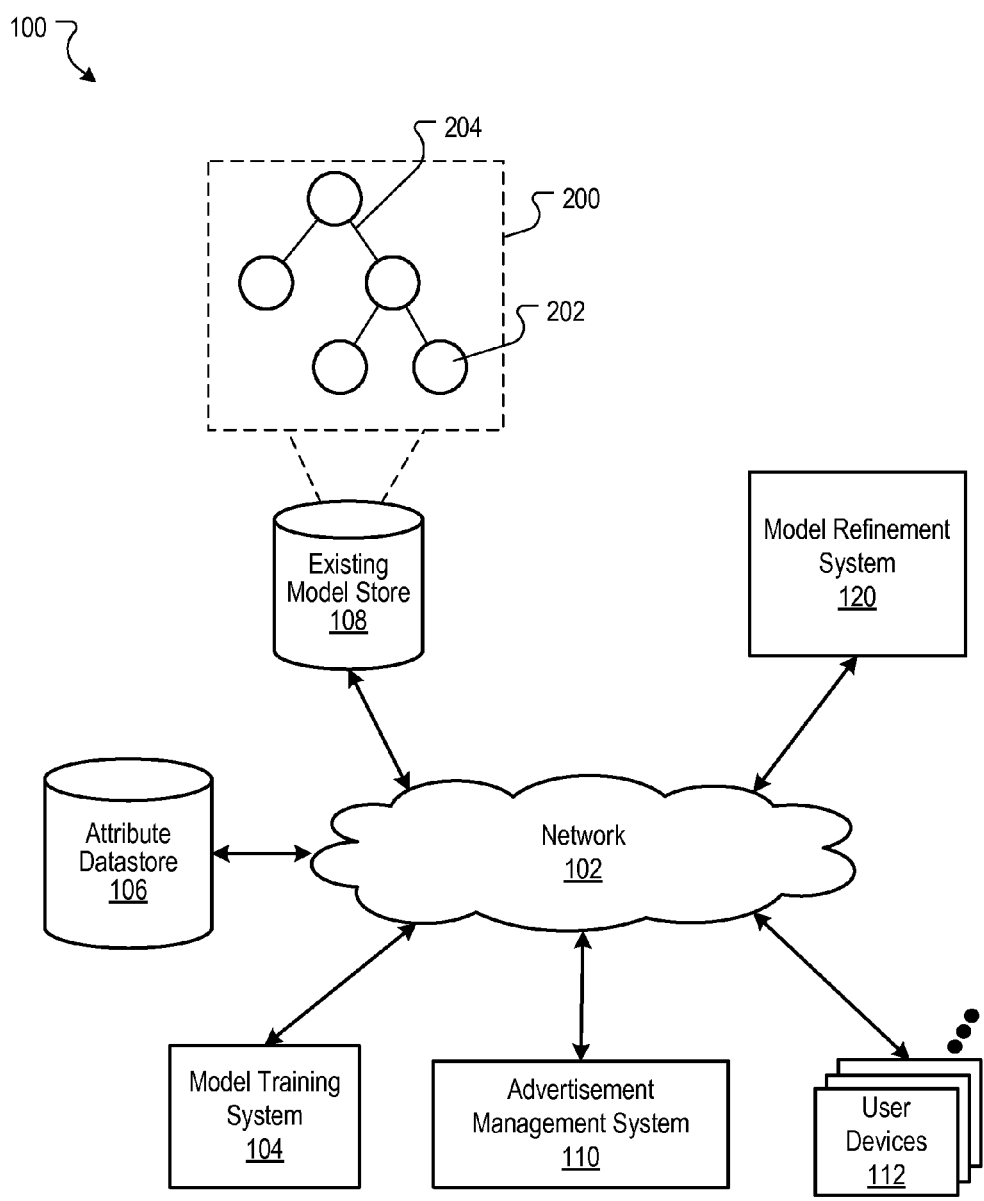
FIG. 1 is a block diagram of an online environment in which a model refinement system refines decision trees.

Referring to FIG. 1, an online environment 100 in which decision trees are generated and refined includes a network 102 such as a local area network (LAN), a wide area network (WAN), the Internet, or a combination thereof. The network 102 connects a model training system 104, an attribute data store 106, an existing model data store 108, and the model refinement system 120. In some implementations, the network 102 can also connect an advertisement management system 110 and user devices 112.

The attribute data store 106 is a data storage device that stores training sets with which a decision tree can be trained and refined. The attribute data store 106 can store records that characterize an item, object, environment, or person and are defined by a set of attribute values. For example, a record that characterizes a user's online account can be defined by attribute values such as a hash of an Internet Protocol ("IP") address, a hash of a password, a telephone number, an e-mail address, and/or other data that characterizes the user's online account.

The training sets stored in the attribute data store 106 are made available to the model training system 104 and model refinement system 120 over the network 102. The training sets or portions of the training sets can be provided, retrieved, or accessed, for example, in response to a request from the model refinement system 120 and/or the model training system 104 for the training sets.

A user device 112 is a data processing device that is under control of a user and is capable of transmitting and receiving data over the network 102. Example user devices 112 include personal computers, mobile communication devices, and other devices that can send and receive data over the network 102. A user device 112 typically includes a user application, such as a web browser, to facilitate the sending and receiving of data over the network 102.

The advertisement management system 110 is a data processing system that manages advertising services and accounts for advertisers and publishers of content. For example, advertisers can access the advertisement management system 110 using user devices 112 to upload advertisements for presentation with publisher's content, edit advertisements, provide targeting criteria for advertising campaigns, and view reports detailing presentation advertisements and corresponding payments due for the presentations. Publishers can access advertisement management system 110 using user devices 112 to add new Web sites with which they would like advertisements presented, adjust settings associated with their account, and view reports detailing advertisements that have been presented with their Web sites and the corresponding revenue for presentation of the advertisements.

Each user (i.e., advertiser or publisher) that accesses the advertisement management system 110 can be required to create a user account. Each user generally specifies a username and password for accessing their user account so that access to the account is limited to users that know the username and corresponding password for the account. Thus, requiring users to register a user account restricts access to the user's personal and account information and reduces the likelihood that a third party can obtain this information or obtain control of the user's account.

Requiring users to register user account also provides the ability for the advertisement management system 110 to enforce policies associated with the user accounts. The policies can be specified, for example, in a user agreement that the users agree to abide by when generating their accounts. For example, a user agreement for using the advertisement management system 110 can require that publishers of Web content that are requesting advertisements from the advertisement management system 110 refrain from including explicit material on Websites with which the requested advertisements will be presented. Similarly, the user agreement can require advertisers that use the advertisement management system 110 for distribution of advertisements to Websites to refrain from including explicit material in advertisements that are provided by the advertisement management system 110 or using the advertisement management system 110 to distribute "spam," as may be defined by a user agreement. The user agreement can also include policies regarding copyrights, false or misleading content or advertising, and/or malicious activities.

In some situations, a user of the advertisement management system 110 may create one account with which they use the advertisement management system 110 in compliance with the user agreement, while creating a second account with which they use the advertisement management system 110 in violation of the user agreement. Thus, it can be beneficial to identify separate accounts that are commonly owned so that both accounts can be suspended or terminated when a common owner of the accounts is in violation of the user agreement.

A pair of accounts that are commonly owned or controlled can be considered duplicate accounts. Duplicate accounts can be identified, for example, based on the attribute values that characterize the pair of accounts. For example, if two accounts are associated with the same Internet protocol address, same e-mail address, and same telephone number, it is likely that the two accounts are duplicate accounts. Duplicate user accounts can be identified, for example, through human inspection of a pair of accounts, or using a model generated, for example, using a machine learning algorithm.

Human analysis of a pair of accounts to determine whether the accounts are duplicate accounts can be performed by comparing the attribute values of the pair of accounts and making decisions based on the similarity between the two accounts. Human analysis of the pair of accounts can be a resource intensive process and can be prone to error. Additionally, the number of accounts that can be analyzed by humans is much more restricted than the number of accounts that can be analyzed by machines Machine learning algorithms can also be used to train models for identifying duplicate accounts based on the attribute values of the accounts. The model training system 104 is a data processing system, such as a personal computer or server, that can use a machine learning algorithm to create a model for identifying duplicate accounts. In some implementations, the model training system 104 includes instructions for training or otherwise defining decision trees. For example, the model training system 104 can be a computing device (e.g., a server) that implements a C4.5 decision tree training algorithm in Weka. While the C4.5 decision tree training algorithm is provided for example purposes, other decision tree training algorithms can be used.

To train a decision tree, the model training system 104 requests data from the attribute data store 106 and applies the decision tree training algorithm to the data. The model training system 104 uses the decision tree training algorithm to identify attribute values that define split points for the training set. Split-points are attribute values at which a training set is segmented, as described in more detail with reference to FIG. 2.

The attributes for which the split points are defined can be selected, for example, by a user of the model training system 104. For example, a user can specify that the decision tree is to be trained to identify duplicate user accounts based on attribute values that characterize the user accounts. In turn, model training system 104 can identify attribute values for the training set that can be used to predict whether two accounts are duplicate accounts, based for example, on attribute values of accounts that are known to be duplicate accounts and attribute values of accounts that are not known to be duplicate accounts. The model training system 104 can iteratively identify additional attribute values that can also be used to predict whether two accounts are duplicate accounts.

In some implementations, a match score for each attribute of the pair of user accounts can be used as the attribute values for generating the decision tree. A match score is a measure of similarity between attribute values for matching attributes of the pair of user accounts. For example, the match scores for attributes of a pair of user accounts can be values between 0.0 and 1.0. A match score of 0.0 can represent an attribute for which the user accounts do not have attribute values or the similarity of the attribute values is below a minimum similarity threshold. A match score of 1.0 can represent, for example, two attribute values that have a same value.

The model training system 104 can generate a decision tree 200 that includes nodes 202 and branches 204 that are defined based on the identified match scores, as described with reference to FIG. 2. The model training system 104 can store the decision tree 200 in the existing model store 108 so that the decision tree 200 can be accessed, retrieved, or requested over the network 102.

Once a decision tree 200 has been generated, it can be used to predict results based on input data. For example, the advertisement management system 110 can access the decision tree 200 and input match scores for a pair of accounts. In turn, the decision tree 200 can provide as output an indication of whether the pair of accounts are duplicate accounts. The prediction can be based, for example, on a classification of the pair of accounts as duplicate or non-duplicate accounts, based on their respective match scores.

Decision trees 200 generated by the model training system 104 can be used to identify duplicate accounts. However, the decision trees 200 generated by the model training system may have an error rate that is higher than an error rate that is specified by a user as being acceptable. Additionally, the decision trees 200 may not identify an acceptable portion of the total duplicate accounts. For example, when a determination that is being made is to suspend, delete, or take other action with respect to a pair of accounts that have been identified as duplicate accounts, the error rate for identifying non-duplicate accounts as duplicate accounts should be very low so that user accounts are not incorrectly suspended or deleted.

The accuracy of the models generated by the model training system 104 can be increased so that fewer non-duplicate accounts are identified as duplicate accounts. However, when the model training system 104 is adjusted to provide a lower error rate, it generally results in identification of a lower portion of the total duplicate accounts (i.e., lower coverage of the duplicate accounts). Thus, the combined accuracy and coverage measures (i.e., quality measures) for the initial models generated by the model training system 104 may not meet quality thresholds that are specified by the advertisement management system 110 or another user of the model.

The model refinement system 120 is a data processing system that is implemented to refine a decision tree 200 to reduce the error rate for identifying duplicate accounts, while still providing sufficient coverage of the duplicate accounts. Thus, quality measures for a decision tree refined by the model refinement system 120 will be higher than the initial models generated by the model training system 104.

The model refinement system 120 can access or request a decision tree 200 that has been generated, for example, by the model training system 104 from the existing model store 108 over the network 102. The model refinement system 120 identifies rules for classifying pairs of accounts as duplicate accounts by traversing the nodes and branches of the decision tree, as described with reference to FIG. 2. The model refinement system 120 adjusts the rules based on a similarity relationship that duplicate accounts have more similar match scores than non-duplicate accounts, as described with reference to FIG. 3. Using the adjusted rules, the model refinement system 120 classifies pairs of data in the initial training set used to generate the decision tree 200. The model refinement system 120 then filters the initial training set to remove data records representing non-duplicate accounts that are incorrectly classified as duplicate accounts to generate a filtered training set, as described with reference to FIG. 3.

The model refinement system 120 provides the filtered training set to the model training system 104. In turn, the model training system 104 generates an intermediate decision tree that is stored, for example, in the existing model store 108 or provided to the model refinement system 120. The model refinement system 120 receives the intermediate decision tree from the model training system 104 or existing model store 108, identifies split-rules ("rules") for classifying pairs of accounts as duplicate accounts and adjusts the rules to generate final split-rules, as described with reference to FIG. 3. The final split-rules can be used to classify pairs of data records (representing pairs of accounts) as duplicate pairs (representing duplicate accounts) based on attribute values and/or match scores for the accounts that are provided as input to the final split-rules or otherwise analyzed according to the final split-rules.

Refinement of decision trees using the model refinement system 120 is described with reference to decision trees that are trained for identifying duplicate user accounts in the context of an advertisement management system. However, the description is also applicable for refining decision trees that are used to identify duplicate user accounts for other systems as well as decision trees that are used to predict other results. For example, the model refinement system 120 can be used to refine decision trees for an initial training set in which more similar data records have more similar attribute values.

Figure 2:
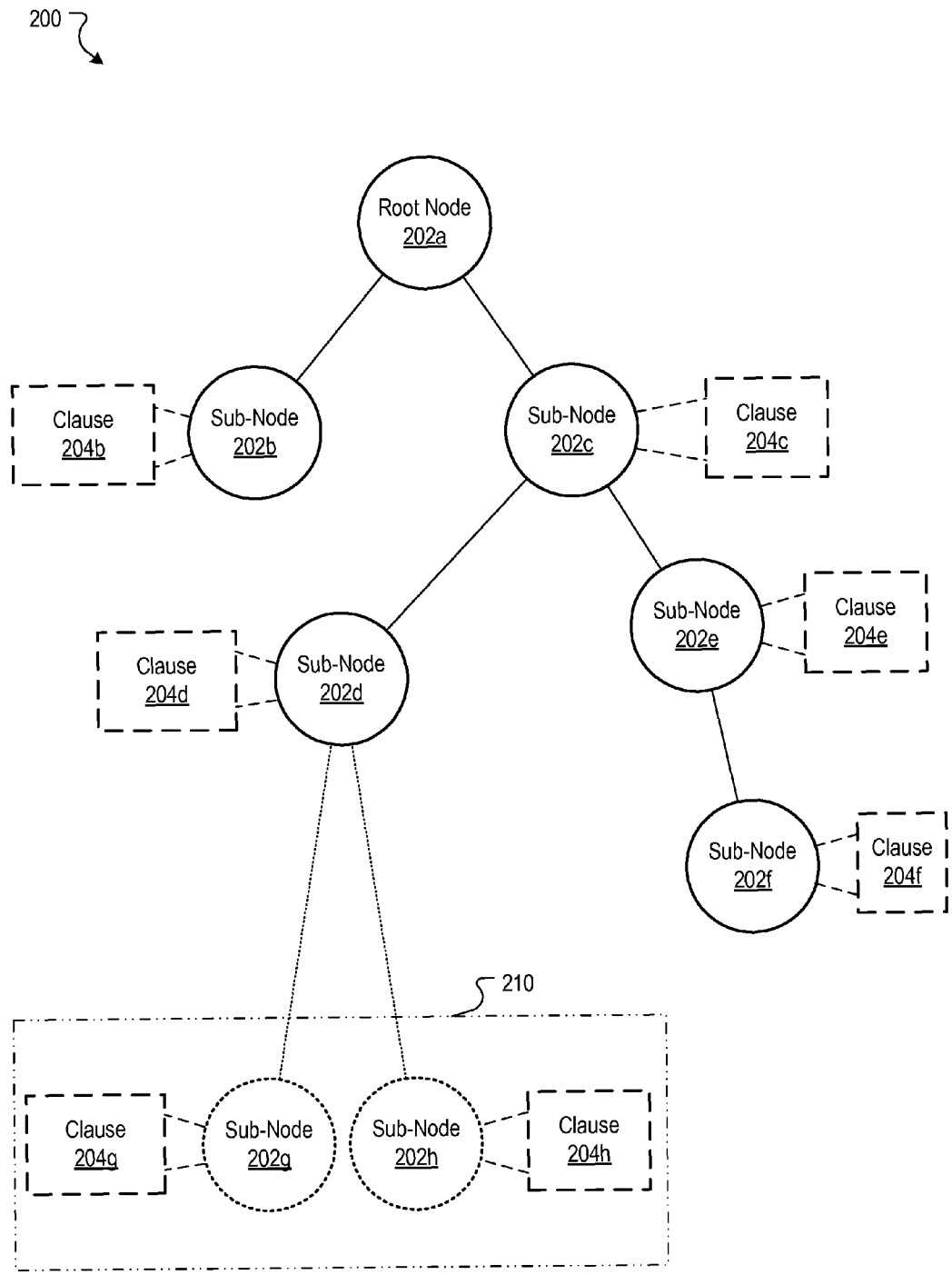
FIG. 2 is a block diagram of an example decision tree that can be refined by the model refinement system.

FIG. 2 is a block diagram of an example decision tree ("tree") 200 that can be generated by the model training system 104 and refined by the model refinement system 120. The tree 200 is a hierarchical set of nodes 202, with a root node 202a being the node from which each other node is subordinate. For example, the nodes 202b and 202c are directly subordinate to the root node 202a.

Each node 202 represents a unique set of data relative to the sets of data represented by other nodes. For example, the root node 202a represents the full training set that is used to define the tree, while the sub-nodes 202b-202e represent corresponding narrower subsets of the full training set. Additionally, the combination of subsets represented by sub-nodes 202b and 202c represent the full training set, as does the combination of subsets represented by sub-nodes 202b, 202d, and 202e. Thus, the subsets represented by nodes 202b, 202d, and 202e can be disjointed subsets of the full training set.

Each of the subsets represented by the nodes 202b-202e are defined based on split-points for the full training set and split-points for intervening subsets represented by nodes between the node for which the subset is defined. For example, the subset represented by node 202c is defined by the split-point for the training set represented by the node 202a, while the subset represented by the node 202d is defined by the split-points for the training set represented by the node 202a and the subset represented by the node 202c.

The split-point for a node is at least one attribute value (or match score) that is used to partition the training set (or subset) that is represented by the node and to define subordinate subsets of the training set and corresponding sub-nodes that represent the subsets. The split-point for a set of continuous attribute values (e.g., $0.0 \leq$ attribute value $\leq 1.0$) can be, for example, a discrete value (e.g., 0.25) within the set of continuous attribute values. The split-point for categorical attributes (e.g., color=red, green, blue, or yellow) can be an individual categorical value (e.g., color=red) or any categorical value in a set of values (e.g., red, green or blue). The description that follows describes split-points with reference to continuous attribute values, but is also applicable to categorical attribute values.

The split-points for a training set or subset can be represented by clauses for the sub-nodes (or branches) that are defined by the split-points. A clause defines a relationship that specifies attribute values (e.g., match scores) that satisfy the clause. Clauses can be used to identify the data records that are represented by a node or sub-node. For example, clauses 204b and 204c specify attribute values that data records from the training set represented by node 202a must have to be respectively represented by sub-nodes 202b and 202c. The clause 204b can specify, for example, that data records having an attribute value less than or equal to 0.25 for attribute_1 satisfy clause 204b, while clause 204c can specify that data records having an attribute value greater than 0.25 for attribute_1 satisfy clause 204c. Thus, data records from the training set represented by node 202a that have attribute values for attribute_1 that are less than or equal to 0.25 are represented by the sub-node 202b, while the data records having attribute values for attribute_1 that are greater than 0.25 are represented by sub-node 202c.

A set of one or more clauses define a split-rule that can be used to identify data records that are represented by a particular node. For example, a split-rule specifying records that are represented by sub-node 202d can be defined as a combination of the clause 204d and the clause 204c, which can be represented by the notation "C-D." Similarly, a split-rule specifying records that are represented by sub-node 202f can be defined as a combination of clauses 204c, 204e and 204f, which can be represented by the notation "C-E-F."

The split-rules defined by the decision tree can be adjusted by the model refinement system 120 of FIG. 1 based on a similarity relationship of the records of the training set. For example, when the decision tree 200 is generated to identify duplicate accounts, the similarity relationship can be defined by the duplicate accounts having attribute values that are more similar than non-duplicate accounts. Thus, the match scores for a pair of duplicate accounts will be higher than those for a pair of non-duplicate accounts. Thus, when identifying a pair of duplicate accounts, match scores that are greater than split-points are more indicative of duplicate accounts than match scores that are less than the split-points.

In some implementations, the model refinement system 120 can remove clauses from a split-rule based on the clause being satisfied by match scores that are less than the split-point with which the clause was defined. For example, assuming that the split-point for node 202c has a value of X for attribute 2 and that clause 204e is satisfied by match scores for attribute 2 that are less than or equal to X. In this example, the model refinement system 120 can remove clause 204e from the split-rule that specifies the data records that are represented by the node 202f because clause 204e is satisfied by pairs of data records having match scores that are less than the split-point with which the clause 204e is defined. The resulting split-rule for node 204f will be adjusted from C-E-F to C-F, based on the removal of clause 204e.

The split-rules can be also be adjusted to include additional clauses that were not originally defined based on the tree 200. For example, additional clauses 204g and 204h can be defined by the data refinement system 120 by identifying additional match scores for attributes with which the data records represented by sub-node 202d can be segmented, as described in more detail below with reference to FIG. 3.

The decision tree 200 can be refined by the model refinement system 120 to generate final split-rules that can be used to identify duplicate accounts. For example, the model refinement system 120 can respectively remove initial clauses from initial split-rules defined by the decision tree 200 based on a similarity relationship of the data records used to generate the decision tree 200. Additionally, the model refinement system 120 can adjust the split-rules to include additional clauses that can increase quality measures for the split-rules and a resulting decision tree.

Figure 3:
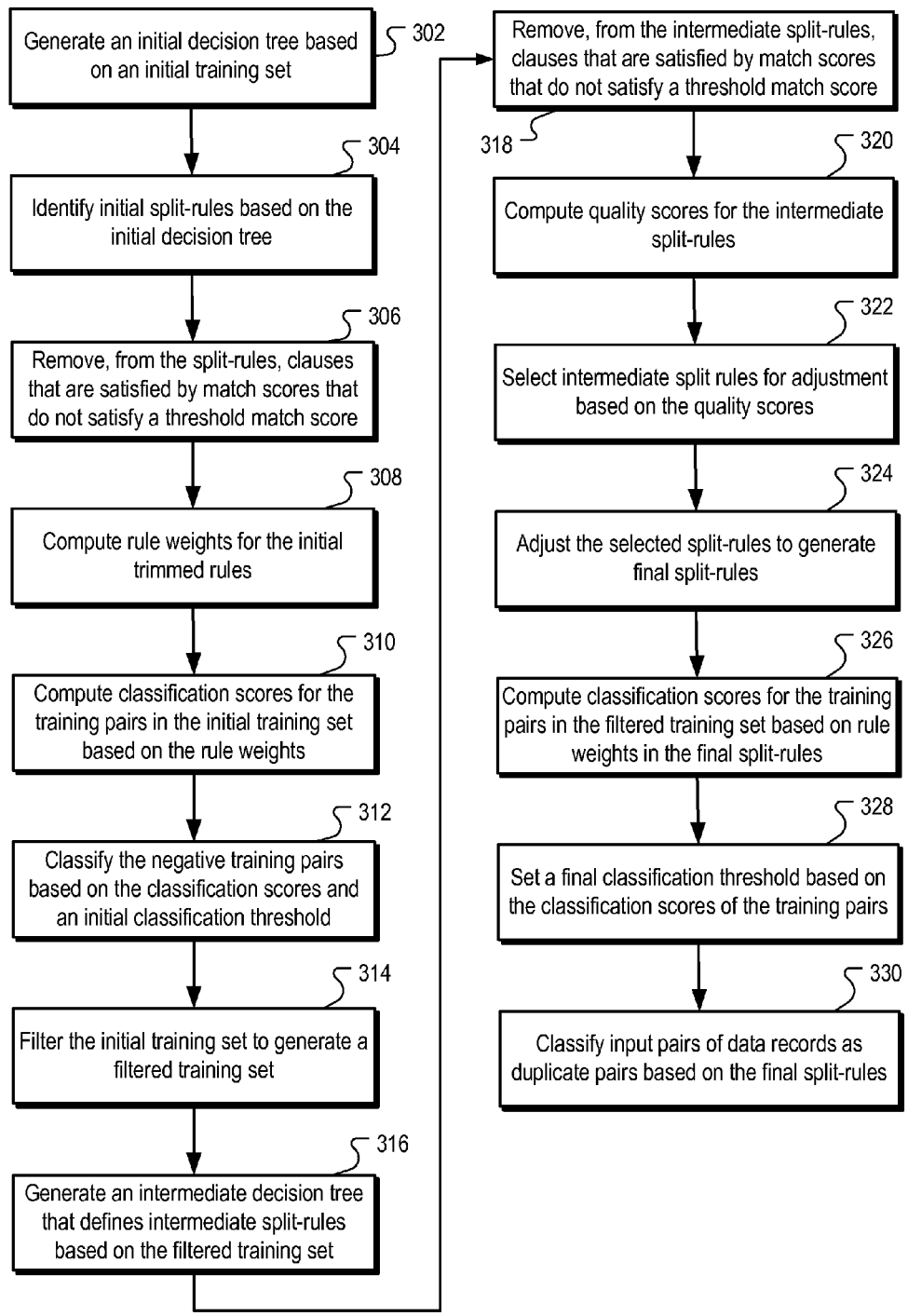
FIG. 3 is a flowchart of an example process for refining split-rules defined by a decision tree.

FIG. 3 is a flow chart of an example process 300 for refining a decision tree. The process 300 is a process by which an initial decision tree is refined to generate final split-rules that can be used to classify a pair of accounts as duplicate accounts. The initial decision tree is refined, in part, by removing from the split-rules the clauses (and corresponding nodes) that are satisfied by data records having match scores that are not greater than the split-point by which the clause is defined.

Once the clauses are removed, the training pairs in the initial training set are classified using the remaining clauses of the split-rules and the initial training set is filtered based on the classification to generate a filtered training set. The filtered training set is used to generate an intermediate decision tree that defines intermediate split-rules.

Clauses can be removed from the intermediate rules based on the similarity relationship and quality scores computed for the intermediate split-rules. The quality scores are used to select intermediate split-rules for adjustment and additional clauses are added to the selected intermediate split-rules to generate final split-rules. The final split-rules can be used to classify new pairs of data records as duplicate data records.

In some implementations, the process 300 can be implemented, for example, in the environment 100 of FIG. 1. In other implementations, the process 300 can be implemented as instructions encoded on a computer readable medium that when executed cause a data processing device or system to perform operations of the process 300. The process 300 is described below with reference to removing and adding clauses from split-rules. In some implementations, each removal or addition of a clause can correspond to and represent a removal or addition of a node and corresponding branch of a corresponding decision tree.

With reference to FIG. 3, an initial decision tree is generated based on an initial training set (302). In some implementations, the initial decision tree is a hierarchical set of nodes and branches, as described with reference to FIG. 2. The initial decision tree defines initial split-rules that include one or more clauses that specify match scores of data records that satisfy the split-rule. The initial decision tree can be generated, for example, by the model training system 104 of FIG. 1.

In some implementations, the initial training set is a set of data records specifying match scores for pairs of user accounts for online services. The match scores for a pair of user accounts can be based, for example, on similarity measures for corresponding attributes for each of the user accounts in the pair of user accounts. The similarity measures for each of the corresponding attributes can be based on a difference between the attribute values for the user accounts. For example, when a large mathematical difference exists between the attribute values for a particular attribute for each user account, the similarity measure for the particular attribute can be small relative to the similarity measure for a different attribute for which the user accounts have the same or very similar attribute values.

The similarity measures for the attributes of the pairs of user accounts can be normalized to create discrete match scores between 0.0 and 1.0 so that match scores for pairs of data records can be compared on a common scale. When the similarity measures are normalized to match scores between 0.0 and 1.0, a match score of 0.0 can represent a pair of data records having very different match scores for a corresponding attribute relative to a pair of data records having a match score of 1.0. Thus, when determining whether a pair of data records are duplicate records, a higher match score is more indicative that a pair of data records are similar and/or a duplicate pair than a lower match score.

In some implementations, the initial training set includes positive training pairs of data records ("positive training pairs") and negative training pairs of data records ("negative training pairs"). The positive training pairs are pairs of data records that are identified as duplicate data records. The positive training pairs can be, for example, pairs of data records that have been identified by human evaluators or other machine learning techniques as being duplicate pairs of data records. For example, in response to an indication that two user accounts may be duplicate user accounts, a human evaluator or model generated by a machine learning technique can be used to verify that the user accounts are considered duplicate accounts. In turn, the pair of data records representing the user accounts can be stored in a datastore as a duplicate pair and, in turn, used as a positive training pair.

The negative training pairs are pairs of data records that have not been identified as duplicate data records. The negative training pairs are not required to be identified as not being duplicate. For example, the negative training pairs can be pairs of data records that are semi-randomly selected from a set of data records not known to have a duplicate data record. The negative training pairs can be selected without first determining whether the data records that define the negative training pairs are potentially duplicate pairs.

In some implementations, the initial training set can include a specified ratio of the number of positive training pairs relative to the number of negative training pairs. An example threshold ratio can specify, for example, that one positive pair be selected for every 10 negative pairs selected (i.e., threshold ratio=0.1). Because the positive training pairs have been verified as being duplicate pairs, there will generally be fewer positive training pairs available than negative training pairs. Therefore, the total number of training pairs in the initial training set can be based on the number of available positive training pairs. For example, if there are 10,000 positive training pairs and the threshold ratio is 0.1, then 100,000 negative training pairs will be selected. The threshold ratio can be determined, for example, based on a target error rate that can be computed based on a portion of the total number of non-duplicate pairs (i.e., negative pairs) that are falsely identified as duplicate pairs (i.e., positive pairs). For example, the target error rate can require that a decision tree falsely identify no more than 0.01% of non-duplicate pairs as duplicate pairs. The threshold ratio can be adjusted until the target error rate is achieved. Thus, the threshold ratio can be selected as the ratio at which the target error rate is achieved.

Initial split-rules are identified based on the initial decision tree (304). In some implementations, the initial split-rules can be identified and/or extracted by traversing the nodes and branches of the initial decision tree, as described with reference to FIG. 2. For example, the split-rule can be identified by beginning at the root node of the decision tree and traversing branches to sub nodes until a most subordinate sub node is reached. The split-rule is defined as a combination of the clauses that are associated with each sub node that was traversed. Referring to FIG. 2, the set of split-rules for a decision tree including nodes 202a-202f includes the split-rules (B, C-D, and C-E-F) that respectively specify the clauses that data records must satisfy to satisfy the split-rules.

Clauses that are not satisfied by match scores that satisfy threshold match scores are removed from the initial split-rules to generate initial trimmed rules (306). In some implementations, the threshold match score can be set to a value equal to or greater than the split-point for the attribute with which the clause (and corresponding node) was defined. For example, if a split-point for an attribute is equal to 0.5, then the threshold match score can be set to 0.5 (or 0.51).

Setting the threshold match score in this manner results in clauses that are satisfied by training pairs having match scores less than the split-point being removed from the split-rules. For example, referring again to FIG. 2, assuming that the clause 204e is satisfied by match scores less than the value X (the split-point) for attribute 2, node 202e will represent data records having match scores for attribute_2 that are less than X. Therefore, the model refinement system 120 can remove clause 204e from the split-rule specifying data records that are represented by the node 202e. The resulting split-rule will be adjusted from C-E-F to C-F, based on the removal of clause 204e.

Rule weights are computed for the initial trimmed rules (308). In some implementations, a rule weight for a rule is computed based on the training pairs that satisfy the rule. In some implementations, a training pair satisfies a rule when the training pair has match scores that satisfy the clauses of the rule. For example, a rule can have two clauses A and B that respectively specify match scores greater than 0.45 and 0.60 for two attributes (i.e., attribute_1 greater than 0.45 and attribute_2 greater than 0.60). In this example, a training pair having a match score for attribute_1 that is greater than 0.45 and a match score greater than 0.60 for attribute_2 will satisfy the rule irrespective of whether the training pair is a positive training pair or a negative training pair.

The weight of an initial trimmed rule is a value specifying a measure of accuracy for the initial trimmed rules. In some implementations, the weight of an initial trimmed rule can be computed based on a number, percentage or portion of the positive training pairs that satisfy the rule relative to a number, percentage or portion of the negative training pairs that satisfy the rule. For example, initial trimmed rule weights can be computed according to relationship (1).

$$RuleWeight(i) = \frac{TruePositiveRate(i)}{k + FalsePositiveRate(i)}$$

Where,

RuleWeight(i) is the weight for initial trimmed rule(i);

TruePositiveRate(i) is a ratio of a number of positive training pairs that satisfy the initial trimmed rule(i) relative to a total number of positive training pairs in the initial training set;

FalsePositiveRate(i) is a ratio of a number of negative training pairs that satisfy the initial trimmed rule relative to a total number of negative training pairs in the initial training set; and k is a constant (e.g., 1.0) to prevent RuleWeight(i) from being indeterminate and/or to ensure that the RuleWeight(i) is a value less than 1.0.

The initial trimmed rules can be ranked, for example, based on their respective weights. For example, the initial trimmed rule having a highest weight can be a highest ranked rule, with the remaining rules ranked in descending order of their respective rule weights.

In some implementations, only initial trimmed rules that have at least a threshold rule weight may be used to calculate classification scores for training pairs, as described below. The threshold rule weight can specify a discrete rule weight value (e.g., 0.40), a number or percentage of the trimmed rules having the highest rule weights, or any other value by which the trimmed rules can be selected or segmented for computing classification scores.

Classification scores are computed for the training pairs in the initial training set based on the rule weights (310). In some implementations, the classification score for a pair of data records can be computed, for example, based on a function of rule weights that the pair of data records satisfies. For example, a classification score for a training record having match scores that satisfy three different rules R1, R2, and R3 having respective rule weights RW1, RW2, and RW3 can be computed as a sum of the rule weights (i.e., classification score=R1+R2+R3). Classification scores can be computed for positive training pairs and negative training pairs.

In other implementations, other functions of the rule weights can be used to compute the classification scores. For example, a logarithmic function of the rule weights, an exponential of the rule weights, or a weighted average of the rule weights can be used to compute the classification score for the training pair.

The negative training pairs in the initial training set are classified based on classification scores and an initial classification threshold (312). In some implementations, training pairs having classification scores that are below the initial classification threshold can be classified as non-duplicate pairs, while training pairs having classification scores above the initial classification threshold are classified as duplicate pairs. In other implementations, the duplicate pairs have classification scores that are below the initial classification threshold, while non-duplicate pairs have classification scores that are greater than the initial classification threshold.

In some implementations, the initial classification threshold is selected as a classification score that provides a specified coverage for the positive training pairs. For example, if the specified coverage is 10% of the positive training pairs in the initial training set, the initial classification threshold can be selected as a classification score that is exceeded by classification scores for only 10% of the positive training pairs. In this example, 90% of the positive training pairs have classification scores below the initial classification threshold. Therefore, the 90% of the positive training pairs below the initial classification threshold would be classified as non-duplicate pairs according to the initial classification threshold. Setting an initial classification threshold that covers only a portion of the positive training pairs reduces the likelihood that a negative training pair will incorrectly be classified as a duplicate pair based on the initial classification threshold.

The negative pairs can be classified based on a comparison of the classification scores for the negative training pairs and the initial classification threshold. Negative pairs having classification scores that meet or exceed the initial classification threshold are classified as positive pairs, while the rest of the negative training pairs are classified as negative training pairs.

The initial training set is filtered to generate a filtered training set (314). In some implementations, the initial training set is filtered to remove the negative training pairs that are classified as duplicate pairs. For example, each negative training pair having a classification score exceeding the initial classification score threshold can be removed from the initial training set. The resulting training set is the filtered training set. Removing the negative pairs that are classified as duplicate pairs based on the trimmed rules provides a training set that is less likely to include negative training pairs that are duplicate pairs. Thus, the filtered training set provides a more uniform set of negative training pairs than the initial training set.

An intermediate decision tree that defines intermediate split-rules is generated based on the filtered training set (316). Each intermediate split-rule includes at least one clause that specifies a match score that a training pair must have to satisfy the clause. The intermediate split-rules can be identified and/or extracted by traversing the nodes and branches of the intermediate decision tree, as described with reference to FIG. 2. The identified intermediate split-rules define a set of intermediate split-rules. The intermediate decision tree can be generated, for example, using a decision tree generation algorithm.

Clauses that are satisfied by match scores that do not satisfy a threshold match score are removed from the intermediate split-rules to produce intermediate trimmed rules (318). In some implementations, the clauses can be removed as described above with reference to generating the initial trimmed rules.

Quality scores are computed for the intermediate split-rules (320). In some implementations, a quality score is a measure of quality for a split-rule that is based on a function of the precision of the split-rule and the coverage of positive pairs provided by the split-rule. The function of the coverage and precision can be a sum, a product, a logarithmic function, an exponential function or any other function of the coverage and precision.

As described above, the coverage of positive training pairs is a number or portion of the total positive pairs that satisfy a split-rule. For example, a split-rule that is satisfied by 99 out of 100 positive pairs in a training set can have a positive pair coverage of 99%.

The precision of a split-rule is a measure of accuracy for the split-rule and can be specified based on a number of negative training pairs that satisfy the node and are classified as positive pairs. For example, the precision of a split-rule can be specified by relationship (2).

$$P(\text{Rule}) = \frac{FalsePositives}{TotalPairs} \quad (2)$$

Where,

P(Rule) is the precision of the split-rule;

FalsePositives is a number of negative training pairs that satisfy the split-rule and are classified as positive pairs; and TotalPairs is a total number of training pairs that satisfy the split-rule.

In some implementations, the precision of the split-rule can also be based on a number of positive training pairs that satisfy the rule and are classified as negative pairs. For example, the precision of a split-rule can be represented by relationship (3).

$$P(\text{Rule}) = \frac{FalsePositives + FalseNegatives}{TotalPairs} \quad (3)$$

Where,

P(Rule) is the precision of the split-rule;

FalsePositives is a number of negative training pairs that satisfy the split-rule and are classified as positive pairs;

FalseNegatives is a number of positive training pairs that satisfy the split-rule and are classified as negative pairs; and TotalPairs is a total number of training pairs that satisfy the split-rule.

Intermediate trimmed rules are selected for adjustment based on the quality scores (322). In some implementations, the intermediate trimmed rules are selected for adjustment based on one or more quality thresholds. For example, a minimum quality threshold can specify a minimum quality score that an intermediate trimmed rule must have to be selected. Intermediate trimmed rules that do not have at least the minimum quality score can be removed from the set of intermediate trimmed rules.

Additionally, a high quality threshold can specify a minimum quality score that an intermediate trimmed rule must have to be considered a high quality rule. Intermediate trimmed rules that exceed the minimum quality threshold, but do not exceed the high quality threshold, are considered medium quality rules. Medium quality rules are selected to be adjusted to generate final rules, as described below.

Intermediate trimmed rules that satisfy the high quality threshold are considered high quality rules and selected for adjustment based on a number of clauses that are included in the rules and/or a correlation score for the clauses. In some implementations, high quality rules that have at least a threshold number of clauses are defined as final split-rules rather than being selected for adjustment. The threshold number of clauses can be selected, for example, based on a positive pair coverage that is desired. For example, if 99% positive pair coverage is desired, then the threshold number of clauses can be set to a number of clauses that provide 99% positive training pair coverage.

In some implementations, the high quality rules that are defined as final split-rules are high quality rules that have at least the threshold number of clauses and at least a specified portion of the clauses have less than a specified maximum correlation score with the other clauses. The correlation score for a pair of clauses is a measure of similarity between the training pairs that satisfy the clause. Requiring final split-rules to include at least a specified portion of clauses having a correlation score that is less than a maximum correlation score helps ensure that the final split-rule will have higher precision than it may otherwise have had if each clause were highly correlated.

For example, if a first clause is satisfied by a set of training pairs (TP1-TP100) and a second clause is satisfied by the same set of training pairs (TP1-TP100), then the clauses will have a high correlation score because each of the training pairs (TP1-TP100) includes attributes that satisfy the first clause and the second clause. However, the correlation score between the first clause and a third clause that is satisfied by a set of training pairs (TP50-TP100) may be lower than the correlation score of the first and second clauses because the training pairs (TP50-TP100) satisfy an attribute that is not satisfied by training pairs (TP1-TP49). High quality rules that do not include the threshold number of clauses and/or have a correlation score that exceeds the correlation threshold can be selected for adjustment.

The selected split-rules are adjusted to generate final split-rules (324). In some implementations, the selected rules are adjusted to generate final split-rules, for example, by adding additional clauses to the selected split-rules. Adding additional clauses to the selected split-rules can increase the precision of the split-rules, thereby reducing the likelihood that a non-duplicate pair of data records is identified as a positive pair.

In some implementations, the attributes that are used to add clauses to the split-rule are selected based on an attribute score for the attributes. For example, attributes having higher attribute scores can be selected to be added to the split-rules prior to attributes having lower attribute scores. The attribute score is a measure of the accuracy with which the attribute distinguishes between positive training pairs and negative training pairs relative to the negative training pair coverage for the attribute. Thus, the attribute score can be used to identify attributes that are strong indicators, relative to other attributes, for identifying duplicate pairs. The attribute score for an attribute can be determined, for example, based on relationship (4).

$$AttributeScore(n) = \frac{1 - MinError(n)}{k + NegativeCoverage(n)} \quad (4)$$

Where,

AttributeScore(n) is the attribute score of attribute (n);

MinError(n) is the minimal error rate of attribute (n);

NegativeCoverage(n) is a ratio of the number of negative training pairs that have a match score that satisfies a minimum match score for the attribute (n) relative to a total number of available negative training pairs; and k is a constant (e.g., 1.0) to prevent AttributeScore(n) from being indeterminate and/or to ensure that AttributeScore (n) is a value less than 1.0.

In some implementations, the minimal error rate of attribute (n) can be computed according to relationship (5).

$$MinError(n) = \frac{FalsePositives(n) + FalseNegatives(n)}{TotalPairs(n)} \quad (5)$$

Where,

MinError(n) is the minimal error rate for attribute (n);

FalsePositives(n) is a number of negative training pairs having at least a minimum match score for attribute (n);

FalseNegatives(n) is a number of positive training pairs having less than the minimum match score for attribute (n); and TotalPairs(n) is a total number of available training pairs.

The minimum match score for attribute (n) can be selected based on an amount of desired coverage. For example, a minimum match score that is close to zero (e.g., 0.0001) can be selected so that substantially all training pairs having non-zero match scores for the attribute are covered. As described above, a match score of zero for an attribute is an indication that the training records do not include an attribute value for the attribute or the similarity measure for the attribute values of the training records is below a minimum similarity threshold. Recalling that duplicate pairs have more similar attribute values (and higher match scores) than non-duplicate pairs, an attribute that is a strong indicator for identifying duplicate pairs can be an attribute for which positive training pairs have a non-zero match score and negative pairs have a zero match score. Thus, an attribute that is a strong indicator for identifying duplicate pairs will have a higher attribute score than an attribute that is a weaker indicator.

In some implementations, each selected split-rule is adjusted by adding attributes based on the attribute scores. In other implementations, attributes are added based on the attribute score only for high quality split-rules that did not include at least the threshold number of clauses and/or high quality split-rules for which a specified portion of the clauses did not have a correlation score that was less than the maximum correlation score with the other clauses.

In some implementations, selected split-rules that are not adjusted to include additional attributes based on the attribute scores can be adjusted to include attributes that maximize an adjusted rule function. For example, medium quality rules can be adjusted by adding attributes that maximize the adjusted rule weight function. The adjusted rule weight function is a function that provides a measure of the positive coverage of the adjusted rule relative to the negative coverage of the adjusted rule and the number of negative training pairs that satisfy the adjusted rule relative to the positive training pairs that satisfy the adjusted rule. Relationship (6) is an example of an adjusted rule weight function that can be maximized to select attributes to add to a selected rule.

$$AdjsutedSplitRuleWeight(n) = \frac{\sqrt{PositiveCoverage} * NegativePairs}{(k + NegativeCoverage) * PositivePairs} \quad (5)$$

Where,
AdjustedSplitRuleWeight(n) is the weight of the adjusted split-rule including a clause for attribute (n);
PositiveCoverage is the positive training pair coverage for the adjusted split-rule;
NegativePairs is the number of negative pairs that satisfy the adjusted split-rule;
NegativeCoverage is the negative training pair coverage for the adjusted split-rule;
PositivePairs is the number of positive pairs that satisfy the adjusted split-rule; and
k is a constant to prevent an indeterminate value.

When relationship (6) is used to select attributes for adding clauses to split-rules, the attribute (n) that maximizes the result of relationship (6) can be used to define the clause that is added to the split-rule.

In some implementations, additional attributes can be added to the selected rules until a stop condition occurs. The stop condition can be, for example, a specified number of additional clauses being added to each selected rule, a minimum number of clauses being included in each selected rule, a minimum number of training pairs satisfying each rule, and/or a specified error rate being achieved for the rule.

For example, the stop condition can specify that additional clauses be added to each selected rule until each rule is satisfied by no more than 10 training pairs. In this example, additional clauses will continue to be added to the rule in the manner described above until the rule is satisfied by no more than 10 training pairs.

In some implementations, the stop condition can specify that the selected rule have less than a specified error rate in addition to requiring that no more than the minimum number of training pairs satisfy the rule. Continuing with the example above, once the rule represents no more than 10 training pairs, the number of negative training pairs that are identified as positive pairs (i.e., duplicate pairs) can be used to determine the error rate of the rule. For example, if the rule represents 10 training pairs and one of the training pairs is a negative training pair, the error rate for the rule can be 0.1. Once the stop condition has occurred, the adjusted rules are defined as final split-rules.

In some implementations, multiple final rules can be generated for each selected split-rule to define rule sets. Considering a selected split-rule as a base rule, a different attribute can be used to define the next clause for the base rule. For example, if a selected rule includes two clauses (C1-C2) and there are 10 attributes (A1-A10) for which additional clauses (AC1-AC10) can be added, then ten final rules can be generated based on the single selected rule by using each of the ten attributes as a third clause for the base rule. The resulting rule set will include each of the new rules defined by the base rule (i.e., C1-C2-AC1, C1-C2-AC2, . . . , C1-C2-AC10). The split-rules in the rule set can be adjusted as described above until the split-rules are defined as final split-rule based, for example, on occurrence of the stop condition. Once the stop condition occurs, the final rules can be used to classify training pairs.

Classification scores are computed for training pairs in the filtered rule set based on rule weights for the final split-rules (326). In some implementations, the classification scores are computed for the training pairs in the filtered training set based on the adjusted rule weight function. For example, a result of relationship (6) can be computed for each final split-rule that is satisfied by a training pair. In turn, the classification score for a training pair can be computed based on a function of the results of relationship (6) for the final split-rules satisfied by the training pair. For example, the classification score can be a sum, product, weighted sum, log, or exponential function of the results of relationship (6) for each final split-rule satisfied by the training pair.

When a training pair satisfies multiple final split-rules that are members of a same rule set (i.e., final split-rules defined by a same base rule, as described above), the classification scores for the training pair can be based on a maximum adjusted rule weight for the rule set. For example, the adjusted rule weight can be computed for each final split-rule in a same rule set. In turn, the classification score for the training pair can be computed based on the highest adjusted rule weight for each rule set. An example relationship for computing classification scores for training pairs satisfying multiple final rules in rule sets is provided by relationship (7).

$$ClassificationScore = \Sigma_{AllRuleSets} \max(AdjustedSplitRuleWeight(ruleset)) \quad (7)$$

Where,
ClassificationScore(n) is the classification score for the training pair; and
max(AdjustedSplitRuleWeight(ruleset)) is the maximum adjusted split-rule weight for the rules in a rule set.

The result of relationship (7) is computed as the sum over all rule sets of the maximum adjusted split-rule weight for the rule sets. For example, if a training pair satisfies two final rules in each of two rule sets, the classification score for the training pair can be computed by summing the single maximum adjusted split-rule weight selected from each of the rule sets.

A final classification threshold is set based on the classification scores of the training pairs (328). In some implementations, the final classification threshold is a value that can be used to classify input pairs of data records. For example, input pairs having a classification score higher than the final classification threshold can be classified as positive pairs (i.e., duplicates), while input pairs having classification scores lower than the final classification threshold can be classified as negative pairs (i.e., non-duplicates). The final classification threshold can be selected based on a desired coverage of duplicate pairs. For example, if 30% of the duplicate pairs are to be covered by the final rules, the final classification threshold can be set to a value at which 30% of the positive training pairs has a classification score that is higher than the final classification threshold.

The precision of the final rules can be computed based on a number of negative training pairs that are classified as duplicate pairs relative to a total number of training pairs that satisfy the final rules. If the precision of the final rules is below a desired or target precision, the final classification threshold can be adjusted so that fewer training pairs satisfy the classification threshold. Alternatively, final rules having rule weights that are low relative to the other final rules can be removed from the set of final rules.

Input pairs of data records are classified based on the final split-rules (330). Once the final split-rules are generated, they can be stored in a datastore so that they can be accessed or retrieved for classifying input pairs of data records upon request. For example, match scores for new pairs of data records (e.g., representing user accounts) can be input to the final split-rules to determine whether the pairs of data records are duplicate records (e.g., representing duplicate accounts). The output of the final split-rules can be, for example, a predicted classification based on match scores for the pairs of data records. Actions can be taken based on the output of the final split-rules. For example, if the pair of data records represents a pair of user accounts and the pair of records is identified as a duplicate pair, the owner of the accounts can be contacted or the accounts can be suspended or deleted.

The functional operations described in this specification can be implemented in digital electronic circuitry, or in computer software, firmware, or hardware, including the structures disclosed in this specification and their structural equivalents, or in combinations of one or more of them. The operations also can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may include a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementations can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. For example, the actions recited in the claims can be performed in a different order and still achieve desirable results.

What is claimed is:

1. A computer implemented method, comprising:
   generating, by at least one data processing device, an initial decision tree based on an initial training set, the initial decision tree defining split-rules, each split-rule including at least one clause that specifies a match score that satisfies the clause, the initial training set including training pairs of data records that include positive training pairs that have been identified as duplicate data records and negative training pairs that have not been identified as duplicate data records, each training pair having match scores specifying a measure of similarity for attributes of training pairs;
   removing, by at least one data processing device and from the split-rules, clauses that are not satisfied by match scores that satisfy threshold match scores to generate initial trimmed rules, the threshold match scores being based on attribute split-points that specify match scores at which the initial training set is segmented;
   classifying, by at least one data processing device, the negative training pairs in the initial training set based on the match scores for the negative training pairs and the initial trimmed rules;
   filtering, by at least one data processing device and based on the classification, the initial training set to remove negative training pairs that are classified as duplicate pairs to generate a filtered training set;
   generating, by at least one data processing device, an intermediate decision tree with the filtered training set, the intermediate decision tree defining Y intermediate split-rules;
   adjusting, by at least one data processing device, at least a portion of the intermediate split rules to generate final split-rules; and
   classifying, by at least one data processing device, input pairs of data records as duplicate pairs based on attribute values of the input pairs and the final split-rules.

2. The method of claim 1, wherein classifying a pair of data records as duplicate pairs comprises classifying two user accounts as duplicate user accounts based on the attribute values of the two user accounts and the final split-rules.

3. The method of claim 2, further comprising suspending duplicate user accounts based on the classification.

4. The method of claim 1, wherein classifying the initial training set comprises:
   computing rule weights for the initial trimmed rules based on training pairs that satisfy the initial trimmed rules;
   computing classification scores for the training pairs in the initial training set, the classification scores for the training pairs being based the rule weights of the initial trimmed rules that the training records satisfy; and
   classifying the training pairs based on the classification scores.

5. The method of claim 4, wherein computing rule weights comprises computing, for each initial trimmed rule, a ratio of a number of positive training pairs that satisfy the initial trimmed rule and a number of negative training pairs that satisfy the initial trimmed rule.

6. The method of claim 5, wherein computing classification scores comprises computing, for each training pair, a result of a function of the rule weights for initial trimmed rules that are satisfied by the training pair.

7. The method of claim 6, wherein classifying the negative training pairs comprises:
   classifying negative training pairs having a classification score greater than a threshold classification score as duplicate pairs; and
   classifying negative training pairs having a classification score less than the threshold classification score as non-duplicate pairs.

8. The method of claim 7, wherein filtering the initial training set comprises:
   identifying negative training pairs that are classified as duplicate pairs; and
   removing the negative training pairs that have been classified as duplicate pairs from the initial training set to generate the filtered training set.

9. The method of claim 1, further comprising:
   determining quality scores for the intermediate split-rules based on precision measures and coverage measures of the intermediate split-rules; and
   selecting the portion of the intermediate split-rules for adjustment based on the quality scores.

10. The method of claim 9, wherein selecting the portion of intermediate split-rules comprises selecting intermediate split-rules having less than a threshold number of clauses and having a split-rule quality measure that exceeds a high quality threshold.

11. The method of claim 10, wherein adjusting the portion of the intermediate split-rules comprises selecting, for each selected intermediate split-rule, an additional clause to include in the selected intermediate split-rule, the additional clause specifying an additional match score for an attribute.

12. The method of claim 11, wherein selecting an additional clause comprises selecting an additional clause for an attribute having a highest attribute weight based on an error rate associated with the attribute and a coverage measure for the attribute.

13. The method of claim 1 wherein adjusting the portion of the intermediate split-rules comprises selecting additional clauses that maximize a result of an adjusted rule weight function for the selected intermediate split-rules.

14. A system, comprising:
a datastore storing an initial decision tree that defines initial split-rules and an initial training set, each split-rule including at least one clause that specifies a match score that satisfies the clause, the initial decision tree being generated based on the initial training set, the initial training set including training pairs of data records that include positive training pairs that have been identified as duplicate data records and negative training pairs that have not been identified as duplicate data records, each training pair having match scores specifying a measure of similarity for attributes of training pairs; and
at least one processor of a model refinement system coupled to the datastore, the at least one processor configured to:
remove, from the initial split-rules, clauses that are satisfied by match scores that do not satisfy a threshold match score to generate initial trimmed split-rules;
classify the initial training set based on the initial trimmed split-rules;
filter the initial training set to remove negative training pairs that are classified as duplicate pairs to generate a filtered training set;
generate an intermediate decision tree with the filtered training set, the intermediate decision tree defining intermediate split-rules; and
adjust at least a portion of the intermediate split-rules to generate final split-rules; and
classify input pairs of data records as duplicate pairs based on attribute values of the input pairs and the final split-rules.

15. The system of claim 14, further comprising:
a model training system coupled to the datastore and the model refinement system, the model training system including at least one processor configured to generate the initial decision tree based on the initial training set.

16. The system of claim 15, wherein the model refinement system is further configured to classify the positive training pairs and the negative training pairs based on classification scores for the training pairs and a classification threshold, the classification scores for the training pairs being based on rule weights for the initial trimmed split-rules, the rule weights being based on training pairs having match scores that satisfy the split-rules.

17. The system of claim 16, wherein the rule weights are defined by a ratio of a number of positive pairs that satisfy the initial trimmed split-rules and a number of negative training pairs that satisfy the initial trimmed split-rules.

18. The system of claim 15, wherein the model refinement system is further configured to:
determine quality scores for the intermediate split-rules based on precision measures and coverage measures of the intermediate split-rules;
select the portion of the intermediate split-rules for adjustment based on the quality scores; and
adjust the portion of the intermediate split-rules by removing clauses that are satisfied by match scores that do not satisfy a threshold match score and adding additional clauses for additional attributes based on an attribute weight for the attributes, the attribute weight being based on an error rate for the attribute and a negative training pair coverage for the attribute.

19. A non-transitory computer readable medium encoded with a computer program comprising instructions that when executed cause a computer to perform operations:
generating, by at least one data processing device, an initial decision tree based on an initial training set, the initial decision tree defining split-rules, each split-rule including at least one clause that specifies a match score that satisfies the clause, the initial training set including training pairs of data records that include positive training pairs that have been identified as duplicate data records and negative training pairs that have not been identified as duplicate data records, each training pair having match scores specifying a measure of similarity for attributes of training pairs;
removing, by at least one data processing device and from the split-rules, clauses that are not satisfied by match scores that satisfy threshold match scores to generate first trimmed rules, the threshold match scores being based on attribute split-points that specify match scores at which the initial training set is segmented;
classifying, by at least one data processing device, the negative training pairs in the initial training set based on the match scores for the negative training pairs and the first trimmed rules;
filtering, by at least one data processing device and based on the classification, the initial training set to remove negative training pairs that are classified as duplicate pairs to generate a filtered training set;
generating, by at least one data processing device, an intermediate decision tree with the filtered training set, the intermediate split tree defining intermediate split-rules;
adjusting at least a portion of the intermediate slit-rules to generate final split-rules; and
classifying, by at least one processing device, input pairs of data records as duplicate pairs based on attribute values of the input pairs and the final split-rules.

20. The computer readable medium of claim 19, further comprising instructions that when executed cause the computer to perform operations:
determining quality scores for the intermediate split-rules based on a precision measures and coverage measures of the intermediate split-rules; and
selecting the portion of the intermediate split-rules for adjustment based on the quality scores.

21. A system, comprising:
a datastore storing an initial training set including training pairs of data records that include positive training pairs that have been identified as duplicate data records and negative training pairs that have not been identified as duplicate data records, each training pair having match scores specifying a measure of similarity for attributes of training pairs; and
at least one processor of a model training system coupled to the datastore, the at least one processor configured to generate an initial decision tree based on the initial training set, the initial decision tree defining initial split-rules, each split-rule including at least one clause that specifies a match score that satisfies the clause;

means for removing, from the initial split-rules, clauses that are satisfied by match scores that do not satisfy a threshold match score to generate initial trimmed split-rules; and means for generating final split-rules based on intermediate split rules for an intermediate split tree that is generated based on a filtered data set from which negative training pairs that were classified as duplicate pairs based on the initial trimmed split-rules are removed.

* * * * *

UNITED STATES PATENT AND TRADEMARK OFFICE
CERTIFICATE OF CORRECTION

| | | |
|---|---|---|
| PATENT NO. | : 8,250,008 B1 | Page 1 of 1 |
| APPLICATION NO. | : 12/564452 | |
| DATED | : August 21, 2012 | |
| INVENTOR(S) | : Zhen Cao and Naval Verma | |

It is certified that error appears in the above-identified patent and that said Letters Patent is hereby corrected as shown below:

Claim 1, Column 20, Line 5 (Approx.) – after "defining" delete "Y".

Claim 4, Column 20, Line 26 – delete "based the" and insert -- based on the --, therefor.

Signed and Sealed this
Twentieth Day of November, 2012

David J. Kappos
*Director of the United States Patent and Trademark Office*